Figure 1:
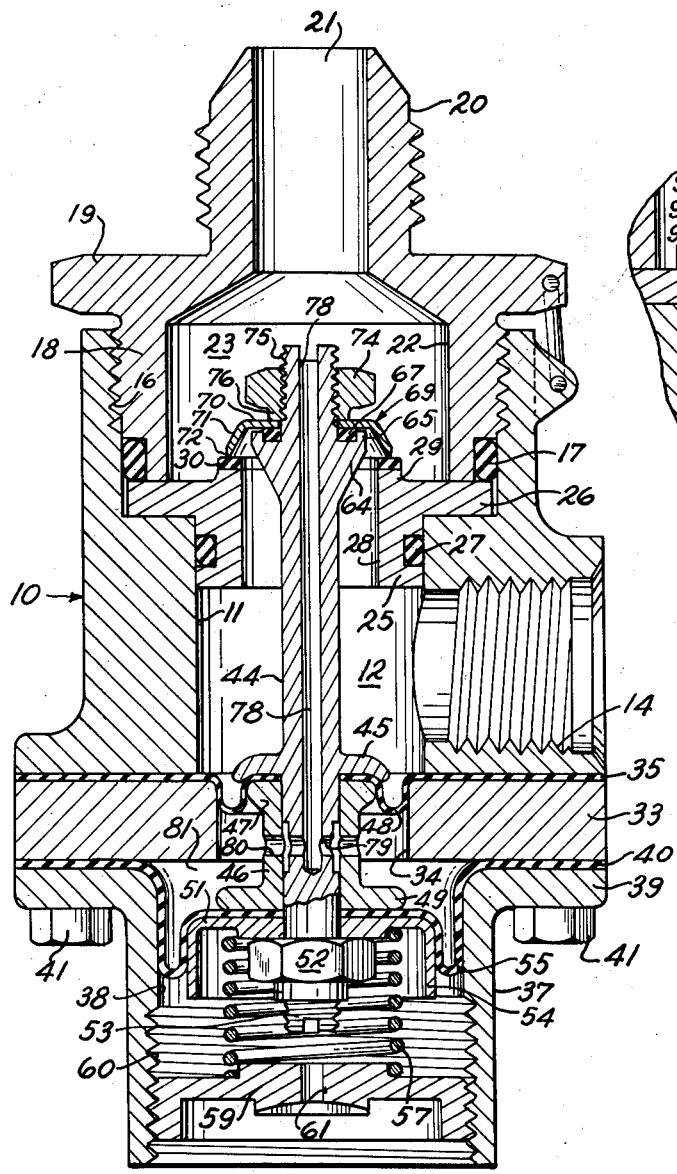

April 30, 1963  G. A. HAMILTON  3,087,705
ADJUSTABLE VALVE HEAD
Filed April 18, 1961

INVENTOR.
GEORGE A. HAMILTON
BY
RICHEY, MCNENNY & FARRINGTON
ATTORNEYS

United States Patent Office 3,087,705
Patented Apr. 30, 1963

3,087,705
ADJUSTABLE VALVE HEAD
George A. Hamilton, Cleveland, Ohio, assignor to The Weatherhead Company, Cleveland, Ohio, a corporation of Ohio
Filed Apr. 18, 1961, Ser. No. 103,814
9 Claims. (Cl. 251—356)

This invention relates generally to valves and more particularly to an adjustable orifice closure for use with valves of the balanced poppet type.

Balanced poppet type valves are generally arranged to have one poppet which makes sealing contact with the adjacent valve seat to control flow of fluid through the valve, together with either a second poppet or a bellows or diaphragm surface exposed to fluid pressure in a manner opposite to the one poppet so that the net pressure forces on the one poppet are balanced out. Such valves are often used for applications where there is a controlled pressure differential across the valves, such as in pressure regulators, to insure that the high pressure at the inlet side of the valve will be balanced so as to exert no net force on the valve poppet tending to open or close the poppet. Since these valves are dependent upon an equalization of the areas exposed to fluid pressure, it is necessary in valves of this type to have these areas exactly balanced in size to obtain optimum performance of the valve.

Therefore it is a principal object of this invention to provide in a poppet valve a valve closure member which is adjustable to vary the effective area of the orifice.

It is another object of this invention to provide a balanced poppet valve in which the effective area of the orifice is adjustable to vary the pressure sealing forces and insure precise balancing of all of the forces acting on the valve closure member.

Another object of this invention is to provide a balanced poppet valve as set forth in the preceding object which allows the valve to be balanced by changing the effective sealing area of the poppet after assembly has been completed without resorting to any machining or metal forming operations.

Still another object of this invention is to provide a novel poppet for use in balanced poppet type valves in which a portion of the poppet is distortable in a controlled manner to vary the effective sealing area of the poppet and thereby regulate the pressure sealing force for balancing the valve.

Further objects and advantages of this invention relating to the simplicity of construction, low cost of manufacture and ease of adjustment will readily become apparent to those skilled in the art upon a more complete understanding of the invention, several embodiments of which are shown in the accompanying drawings and described in detail in the following description.

Figure 2:
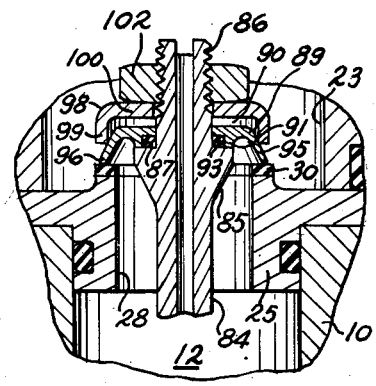

In the drawings:

FIG. 1 is a longitudinal cross-sectional view through a pressure regulator valve incorporating the present invention; and FIG. 2 is a fragmentary cross-sectional view of a valve similar to FIG. 1, but showing a modified form of poppet.

Referring now to the figures in greater detail, the regulator valve shown therein includes a valve body 10 which is provided with an axial bore 11, a portion of which forms the inlet chamber 12. A threaded inlet bore 14 is formed on the valve body 10 and opens into the inlet chamber 12 for connection with the source of fluid pressure. At one end, the valve body 10 is provided with a threaded counterbore 16 coaxial with bore 11. An outlet fitting 18 is threaded in the counterbore 16 and provided with an O-ring seal 17 to prevent fluid leakage at the joint between the outlet fitting and the valve body.

The outlet fitting 18 also has a flange portion 19 and a fitting portion 20 projecting axially therefrom to receive a suitable tube or pipe fitting for the outlet connection. A bore 21 extends inward through fitting portion 20 to open into an enlarged counterbore 22 within the outlet fitting 18 to form an outlet chamber 23.

An orifice plate 25 is positioned within valve body 10 to fit within the axial bore 11. Orifice plate 25 has an O-ring seal 27 to make sealing contact with axial bore 11. A flange 26 extends radially outward from orifice plate 25 within the counterbore 16 and is held in place by gripping contact with the end of outlet fitting 18. A bore 28 extends axially through orifice plate 25 coaxial with axial bore 11, and forms an orifice opening within a raised annular boss portion 29 on the side of the orifice plate in the outlet chamber 23. A sealing ring or valve seat 30, formed of a suitable resilient material such as rubber or the like, is bonded or otherwise secured on top of the annular boss 29 to receive the valve poppet in sealing engagement, as will be described in greater detail hereafter.

A spacer block 33 is fitted on the end of valve body 10 opposite the counterbore 16. Spacer block 33 has a bore 34 extending therethrough in axial alignment with axial bore 11 in valve body 10, and a first or inner flexible diaphragm 35 is positioned between spacer block 33 and the end of valve body 10.

A tubular diaphragm housing 37 is mounted outwardly of spacer block 33. Tubular housing 37 has an axial bore 38 therein, and also has a flange portion 39 which is secured to the valve body 10 by means of cap screws 41 which extend through flange 39, spacer block 33 and into the valve body 10. A second or outer flexible diaphragm 40 is fitted between spacer block 33 and the tubular diaphragm housing 37.

A poppet stem 44 is mounted within the valve body 10 to extend axially through the inlet chamber 12. The poppet stem 44 is provided with a radial flange 45 adjacent the first or inner diaphragm 35, and on the other side of diaphragm 35, a spacer 46 is fitted on poppet stem 44 and has a flange 47 extending adjacent the diaphragm 35. The flanges 45 and 47 serve to support the central portion of diaphragm 35 in a plane perpendicular to the axis of poppet stem 44 and form the diaphragm 35 into an annular fold or convolution at 48 between flange 47 and the walls of bore 34 in spacer block 33. At its other end, spacer 46 is provided with a radially extending flange 49 abutting the second or outer diaphragm 40.

A piston 51 is fitted on the end of poppet stem 44 outwardly of diaphragm 40 and is held in place by means of a nut 52 mounted on the threaded end 53 of poppet stem 44. Nut 52 serves to hold the outer diaphragm 40 clamped between piston 51 and flange 49, and also force the spacer 46 inwardly to clamp the inner diaphragm 35 between the spacer flange 47 and flange 45 on the poppet stem. The piston 51 also has an axially extending flange or skirt 54 which supports the inner side of the annular fold or convolution 55 of outer diaphragm 40, the convolution being supported on the outer side by the walls of bore 38 in tubular housing 37.

A coil spring 57 surrounds the poppet stem within bore 38 on tubular diaphragm housing 37 and abuts at its inner end against piston 51 and at its outer end against a plug 59. Plug 59 is provided with threads on its periphery to engage a threaded portion 60 of bore 38, so that it may be adjusted inwardly and outwardly within bore 38 to vary the amount of compression on the coil spring 57. Plug 59 is also provided with a small vent 61 to maintain the chamber between plug 59 and diaphragm 40 at external atmospheric pressure.

Poppet stem 44 extends axially through bore 28 in orifice plate 25 and has a flanged portion 64 extending radially outward adjacent the valve seat 30. At its axially outer end flanged portion 64 has an axially extending annular lip 65 extending around a channel within which is fitted a resilient O-ring 67. A poppet 69 formed from flexible, elastically deformable material such as sheet metal or the like is fitted on poppet stem 44 outwardly of the flange 64. Poppet 69 has a central radially extending portion 70 adjacent the O-ring seal 67 and annular lip 65, and outwardly of radial portion 70, the poppet has a conical lip or flange 71. The annular edge 72 of lip 71 makes sealing contact on the surface of the resilient valve seat 30. To secure the poppet 69 on poppet stem 44, the stem has a threaded end portion 75 on which is fitted a nut 74. The inner end of nut 74 forms a collar 76 having an outer diameter less than the inner diameter of annular lip 65 to bear against the radial portion 70 of the poppet.

An axial bore 78 extends through poppet 44 from the threaded end 75 within outlet chamber 23 rearwardly to a point adjacent the spacer 46 where a transverse bore 79 in the stem opens adjacent the openings 80 in the spacer 46 to communicate with the chamber 81 between the two diaphragms 35 and 40. Thus the passages through the poppet stem 44 serve to keep the chamber 81 at the same pressure as that within the outlet chamber 23, and the inner diaphragm 35 on its one side is exposed to high pressure within the inlet chamber 12 and other side to the lower outlet chamber pressure within chamber 81, while the poppet 69 is exposed to the inlet chamber pressure on its inner side and the outlet chamber pressure on its outer side. With this arrangement the inlet and outlet pressures will each exert forces on the entire poppet assembly in opposite directions, and will balance each other if the effective area of the poppet 69 as determined by the diameter of annular edge 72 is equal to the effective area of the diaphragm 35 within the bore 34 in spacer block 33. In this balanced condition, the only unbalanced pressure force acting upon the poppet assembly is the outlet pressure within chamber 81 acting on the inner side of outer diaphragm 40 and this force is balanced by the biasing force of coil spring 57. It will therefore be seen that the amount of precompression of coil spring 57 and its biasing force tending to open the valve will be offset by the outlet pressure acting on the outer diaphragm 40 and the poppet will open to permit fluid flow from the inlet to the outlet to maintain a constant outlet pressure in the well known manner.

According to this invention, the effective sealing area of the poppet 69 may be varied so that it exactly equals the effective area of diaphragm 35 for balancing the valve. As previously stated, the poppet 69 is made of flexible, elastically deformable material and is rigidly supported on the poppet stem 44 at the annular lip 65. The collar 76 of nut 74 bears against the radial portion 70 of poppet 69 at a zone radially inward of the annular lip 65. Therefore, the nut 74 can be threaded axially along the threaded end 75 to vary the position of the collar 76 relative to the annular lip 65. Movement of the collar portion 76 toward the O-ring 67 distorts the inner edge of radial portion 70 axially toward the O-ring 67 to compress the latter. This distortion of the radial portion 70 causes the conical lip or flange portion 71 of the poppet to flex outwardly to increase the diameter of the annular edge 72. Since the diameter of the annular sealing edge 72 determines the effective area of the poppet exposed to the pressures within both the outlet chamber 23, the inlet chamber 12, by careful positioning of the nut 74 along the threaded end 75 of the poppet stem, the poppet 69 can be distorted or bent in such a manner that the poppet will present the same effective area to the fluid pressure forces as that of the inner diaphragm 35. The nut 74 and the end of the poppet stem 44 are accessible through the axial bore 21 in the outlet fitting 18, and the adjustment of the nut 74 along the threaded end 75 can be made after the valve has been completely assembled. Thus, the effective poppet area can be adjusted under service conditions after assembly to allow a very precise balance of the valve.

Another embodiment of the poppet is shown in the fragmentary view of FIG. 2. It will be understood that valve body 10, orifice plate 25, and resilient valve seat 30 are exactly the same as in FIG. 1, and that the poppet stem 84 is otherwise the same as poppet stem 44 except that the enlarged flange 85 is provided with a flat radial surface 87 on which the poppet is supported. The poppet 89 has a radial portion 90 surrounding the threaded end 86 of poppet stem 84, and an annular ridge or collar 91 is formed on radial portion 90 a spaced distance away from the threaded end 86 to bear against the radial end face 87 on enlarged flange 85 of the poppet stem. A resilient O-ring seal 93 is fitted between the annular ridge 91 and the poppet stem. Poppet 89 also has a flexible conical flange or lip portion 95 which extends radially and axially from the outer edge of outer portion 90 to make sealing contact with the valve seat 30 along the annular edge 96.

A rigid retaining washer 98 is fitted over the threaded end 86 of the poppet stem outwardly of the poppet 89 and has a radial portion 100 which is spaced away from the poppet 89 by the contact of the edge of the axial flange 99 against the conical lip 95. A nut 102 is threaded on end 86 of the poppet stem to secure washer 98 against the poppet 89.

It will be understood that the conical lip portion 95 of the poppet is flexible and has a conical outer surface which is engaged by the end of the axial flange 99 of washer 98 at a zone between the annular edge 96 and the radial portion 90 of the poppet. Thus, movement of the washer 98 toward the poppet 89 will cause the axial flange 99 to bear on this flexible conical flange or lip 95 to distort the latter and flex it inwardly to decrease the diameter of annular edge 96. The amount of compression applied by the nut 102 and hence the axial position of washer 98 determines the effective diameter presented by the poppet 89 to the fluid pressure forces acting on it. It will be understood that the poppet 89 is generally formed with the annular edge 96 of the conical lip 95 having a greater diameter than necessary to adjust the valve, so that the compression applied by the nut 102 will distort the conical flange inwardly to reduce the sealing area until it equals the area of the diaphragm 35.

Although several embodiments of this invention have been illustrated and described in detail, it will be realized that various modifications of the disclosed structure may be made without departing from the mode of operation and essence of the invention. Therefore, except insofar as they are claimed in the appended claims, structural details may be varied widely without modifying the mode of operation. Accordingly, the appended claims and not the aforesaid detailed description are determinative of the scope of the invention.

What is claimed is:

1. A valve closure member adapted to cooperate with an annular valve seat by reciprocating movement to and from said valve seat along an axis normal thereto comprising a poppet support member, a flexible poppet on said support member, a fixed abutment on said support member engaging one side of said poppet, and an adjustable abutment movable along said support member and engaging the other side of said poppet, the points of engagement of said adjustable abutment and said fixed abutment being spaced radially from each other to selectively distort said poppet to vary the diameter of sealing contact and thereby vary the effective area of the poppet subjected to the pressure sealed against by the closure member.

2. A valve closure member adapted to cooperate with an annular valve seat by reciprocating movement to and from said valve seat along an axis normal thereto comprising a poppet support member, a flexible poppet on said support member having a flexible annular lip adapted to make sealing contact with said valve seat, a first abutment on said poppet support member engageable with one side of said poppet radially inward of said annular lip, and a second abutment on said poppet support member engaging the other side of said poppet radially inward of said annular lip, said abutments being relatively movable and having their points of engagement radially spaced to selectively distort said poppet to vary the diameter of said annular lip and thereby vary the effective area of the poppet subjected to pressure sealed against by the closure member.

3. A valve closure member adapted to cooperate with an annular valve seat by reciprocating movement to and from said valve seat along an axis normal thereto comprising a poppet support member, a flexible poppet on said support member having a frusto-conical lip extending toward said valve seat, said frusto-conical lip having an annular edge engageable with said valve seat to make sealing contact therewith, a fixed abutment on said poppet support member engaging one side of said poppet radially inward of said lip, and an adjustable abutment on said poppet support member engaging the other side of said poppet radially inward of said lip, the points of engagement of said adjustable abutment and said fixed abutment being radially spaced to selectively distort said poppet to vary the diameter of said annular edge and thereby vary the effective area of the poppet subjected to the pressure sealed against by the closure member.

4. A valve closure member adapted to cooperate with an annular valve seat by reciprocating movement to and from said valve seat along an axis normal thereto comprising a poppet support member, said poppet support member having fixed abutment means a spaced distance radially outward from the axis thereof, a flexible poppet on said poppet support member having one side adjacent said fixed abutment means, and selectively movable abutment means axially adjustable along the axis of said poppet support member, said movable abutment means engaging the other side of said poppet at a point radially inward of said fixed abutment means, said fixed and said movable abutment means being cooperable to distort said flexible poppet and vary the effective area of the poppet subjected to the pressure sealed against by the closure member.

5. A valve closure member adapted to cooperate with an annular valve seat by reciprocating movement to and from said valve seat along an axis normal thereto comprising a poppet support member having an axially extending stem portion, a flexible poppet on said stem portion adapted to make sealing contact with said valve seat, an axial flange on said support member engaging one side of said poppet a spaced distance radially outward from the axis of said stem portion, and movable means adjustably secured on said stem portion for axial adjustment therealong, said movable means having an abutment engaging the other side of said poppet at point radially inward of said axial flange, said flange and said abutment being cooperable to distort said flexible poppet and vary the effective area of the poppet subjected to the pressure sealed against by the closure member.

6. A valve closure member adapted to cooperate with an annular valve seat by reciprocating movement to and from said valve seat along an axis normal thereto comprising a poppet support member having an enlarged portion adjacent said valve seat, said support member having a threaded stem portion extending axially away from said enlarged portion away from said valve seat, an axially extending flange on said enlarged portion a spaced distance radially outward of said threaded portion, a flexible poppet secured on said support member and having one side abutting against said radial flange, nut means adjustably secured on said threaded stem portion and abutment means carried by said nut means engageable with the other side of said poppet at point radially inward from said axial flange and adapted to be threadedly moved by said nut means to distort said flexible poppet and vary the effective area of the poppet subjected to the pressure sealed against by the closure member.

7. A valve closure member adapted to cooperate with an annular valve seat by reciprocating movement to and from said valve seat along an axis normal thereto comprising a poppet support member, fixed abutment means on said poppet support member, a flexible poppet on said poppet support member adapted to make sealing contact with said valve seat, said flexible poppet having one side adjacent to said fixed abutment means, selectively movable abutment means axially adjustable on said poppet support member, said movable abutment means engaging the other side of said poppet at a point radially outward of said fixed abutment means, said fixed and said movable abutment means being cooperable to distort said flexible poppet and vary the effective area of the poppet subjected to the pressure sealed against by the closure member.

8. A valve closure member adapted to cooperate with an annular valve seat by reciprocating movement to and from said valve seat along an axis normal thereto comprising a poppet support member, fixed abutment means on said poppet support member, a flexible poppet on said poppet support member, said flexible poppet having a radially extending portion engageable on one side with said fixed abutment means, said flexible poppet having a frusto-conical lip portion radially outward of said radial portion, said frusto-conical lip portion having an annular edge adapted to make sealing contact to said valve seat, selectively movable abutment means axially adjustable along said poppet support member, said movable abutment means having a poppet engaging portion engageable with the other side of said poppet radially outward of said fixed abutment means, said movable and said fixed abutment means cooperating to distort said flexible poppet to change the diameter of said annular edge and thereby vary the effective area of the poppet subjected to the pressure sealed against by the closure member.

9. A valve closure member adapted to cooperate with an annular valve seat by reciprocating movement to and from said valve seat along an axis normal thereto comprising a poppet support member, said poppet support member having a radially extending flange adjacent said valve seat, said poppet support member having a threaded stem portion extending axially beyond said flange away from said valve seat, a flexible poppet on said poppet support member, said flexible poppet having a radially extending portion with one side adjacent said flange, said flexible poppet having frusto-conical lip portion outward of said radial portion, said frusto-conical lip portion having an annular edge adapted to make sealing contact with said valve seat, a nut secured on said threaded stem portion, and abutment means axially movable by relative rotation between said nut and said threaded stem portion, said movable abutment means engaging the other side of said flexible poppet along said frusto-conical lip portion radially outward of said flange to cooperate with said flange to distort said poppet to vary the diameter of said annular edge and thereby vary the effective area of the poppet subjected to the pressure sealed against by the closure member.

References Cited in the file of this patent
UNITED STATES PATENTS

| 2,196,798 | Horstmann | Apr. 9, 1940 |
| 2,905,193 | Campbell | Sept. 22, 1959 |
| 2,920,862 | Beard | Jan. 12, 1960 |

OTHER REFERENCES

Germany, B36059X11/47f, Sept. 6, 1956.